(12) United States Patent
Niizumi

(10) Patent No.: US 11,877,692 B2
(45) Date of Patent: Jan. 23, 2024

(54) HEATING COOKER

(71) Applicant: BALMUDA INC., Musashino (JP)

(72) Inventor: Daisuke Niizumi, Musashino (JP)

(73) Assignee: BALMUDA INC., Musashino (JP)

( * ) Notice: Subject to any disclaimer, the term of this patent is extended or adjusted under 35 U.S.C. 154(b) by 181 days.

(21) Appl. No.: 17/036,640

(22) Filed: Sep. 29, 2020

(65) Prior Publication Data
US 2021/0007549 A1 Jan. 14, 2021

Related U.S. Application Data

(63) Continuation of application No. 15/541,219, filed as application No. PCT/JP2016/051793 on Jan. 22, 2016, now Pat. No. 10,874,250.

(30) Foreign Application Priority Data

Jan. 23, 2015 (JP) ................................ 2015-011474

(51) Int. Cl.
*A47J 37/06* (2006.01)
*A47J 37/08* (2006.01)
(Continued)

(52) U.S. Cl.
CPC ....... *A47J 37/0623* (2013.01); *A47J 37/0664* (2013.01); *A47J 37/08* (2013.01);
(Continued)

(58) Field of Classification Search
CPC .... A47J 37/0623; A47J 37/0664; A47J 37/08; A47J 2027/043; F24C 15/003; F24C 15/327
See application file for complete search history.

(56) References Cited

U.S. PATENT DOCUMENTS 6,232,587 B1 * 5/2001 Kurita .................. H05B 6/6479
219/710
7,060,941 B1 6/2006 Embury et al.
(Continued)

FOREIGN PATENT DOCUMENTS

CN 1975262 A 6/2007
CN 201019578 Y 2/2008
(Continued)

OTHER PUBLICATIONS

Machine Translation of Okamura (JP 2010078243) performed on Aug. 8, 2022 (Year: 2010).*
(Continued)

*Primary Examiner* — Brian W Jennison
(74) *Attorney, Agent, or Firm* — Oliff PLC

(57) ABSTRACT

Cooking is performed to serve tasty food by appropriately managing moisture of an object to be cooked without burning the surface thereof. A box-shaped housing, a cooking cavity for accommodating an object to be cooked, the cooking cavity being arranged within the housing, an upper-face heater and a lower-face heater arranged in the cooking cavity, a boiler arranged within the cooking cavity, a water tray formed outside the cooking cavity and into which a given amount of water that is entirely evaporated in a given steaming time is poured, a water guide passage within the housing, the water guide passage into which water is supplied from the water tray to the boiler; and a control unit for causing an operation to generate steam from the boiler to be performed for at least a steaming time from when cooking starts are provided.

4 Claims, 9 Drawing Sheets

(51) Int. Cl.
*F24C 15/32* (2006.01)
*F24C 15/00* (2006.01)
*A47J 27/04* (2006.01)

(52) U.S. Cl.
CPC .......... *F24C 15/003* (2013.01); *F24C 15/327* (2013.01); *A47J 2027/043* (2013.01)

(56) References Cited

U.S. PATENT DOCUMENTS

| | | |
|---|---|---|
| 2003/0230569 A1 | 12/2003 | Kanzaki et al. |
| 2004/0232140 A1 | 11/2004 | Kanzaki et al. |
| 2005/0139588 A1* | 6/2005 | Kim ............ F24C 15/327 219/400 |
| 2006/0011071 A1* | 1/2006 | Cho ............ F24C 15/327 99/417 |
| 2006/0096970 A1* | 5/2006 | Yang ............ A21B 3/04 219/401 |
| 2007/0023214 A1 | 2/2007 | Ishida et al. |
| 2007/0138160 A1* | 6/2007 | Ando ............ F24C 15/327 219/401 |
| 2007/0215142 A1 | 9/2007 | Uchiyama et al. |
| 2010/0064902 A1* | 3/2010 | Sakane ............ F24C 15/2007 99/474 |
| 2014/0097173 A1 | 4/2014 | Becker et al. |
| 2014/0205727 A1 | 7/2014 | Distaso et al. |
| 2015/0233572 A1 | 8/2015 | Shibuya et al. |

FOREIGN PATENT DOCUMENTS

| | | |
|---|---|---|
| CN | 102934950 A | 2/2013 |
| DE | 102 45 773 C1 | 12/2003 |
| EP | 0 277 337 A2 | 8/1988 |
| EP | 0 376 275 A2 | 7/1990 |
| EP | 1603364 A1 | 12/2005 |
| EP | 1654931 A2 | 5/2006 |
| EP | 1767860 A1 | 3/2007 |
| EP | 2123981 A1 | 11/2009 |
| EP | 2369227 A2 | 9/2011 |
| EP | 2417880 A1 | 2/2012 |
| EP | 2417882 A1 | 2/2012 |
| EP | 2466214 A1 | 6/2012 |
| EP | 2 789 923 A1 | 10/2014 |
| JP | S44-27492 Y1 | 11/1969 |
| JP | S53-41503 U | 4/1978 |
| JP | S63-153327 A | 6/1988 |
| JP | H07-055155 A | 3/1995 |
| JP | H07-324757 A | 12/1995 |
| JP | H08-128653 A | 5/1996 |
| JP | 2004-325004 A | 11/2004 |
| JP | 2005315449 A | 11/2005 |
| JP | 2007-232270 A | 9/2007 |
| JP | 2009-041854 A | 2/2009 |
| JP | 2009-58136 A | 3/2009 |
| JP | 4416744 B2 | 2/2010 |
| JP | 2010-78243 A | 4/2010 |
| JP | 2010078243 * | 4/2010 ............ F24C 1/00 |
| JP | 5117215 B2 | 1/2013 |
| JP | 2014-023801 A | 2/2014 |
| WO | 2006/085317 A2 | 8/2006 |
| WO | 2007/065315 A1 | 6/2007 |
| WO | 2013/116606 A2 | 8/2013 |

OTHER PUBLICATIONS

Apr. 21, 2022 Office Action issued in Korean Application No. 10-2022-7009306.
Jan. 17, 2022 Office Action issued in Canadian Application No. 2,973,550.
Mar. 29, 2016 International Search Report issued in International Patent Application No. PCT/JP2016/051793.
Mar. 5, 2019 Office Action issued in Chinese Patent Application No. 201680004422.3.
Aug. 1, 2019 Office Action Issued in U.S. Appl. No. 15/541,219.
Jun. 3, 2019 Office Action issued in Russian Patent Application No. 2017123361.
Aug. 8, 2018 Extended Search Report issued in European Patent Application No. 16740274.2.
Aug. 17, 2018 Office Action issued in Patent Application No. 11201705468W.
Aug. 8, 2019 Office Action issued in European Patent Application No. 16740274.2.
Jan. 21, 2020 Office Action Issued in U.S. Appl. No. 15/541,219.
Mar. 24, 2020 Office Action issued in Japanese Patent Application No. 2016-570712.
Apr. 15, 2020 Office Action issued in European Patent Application No. 16740274.2.
Jul. 22, 2020 Notice of Allowance Issued in U.S. Appl. No. 15/541,219.
Jul. 20, 2020 Office Action issued in Chinese Patent Application No. 201680004422.3.
Aug. 29, 2021 Office Action issued in Korean Patent Application No. 10-2017-7016131.
Nov. 18, 2021 Office Action issued in European Patent Application No. 16740274.2.
Dec. 8, 2020 Office Action issued in Vietnamese Patent Application No. 1-2017-02704.
May 17, 2021 Office Action issued in European Patent Application No. 16740274.2.
Jun. 21, 2022 Office Action issued in Japanese Application No. 2021-105453.
Oct. 3, 2022 Office Action issued in Canadian Patent Application No. 2,973,550.
Mar. 20, 2023 Office Action issued in Russian Patent Application No. 2020103817.
Jul. 18, 2023 Office Action in Japanese Patent Application No. 2022-155235.

* cited by examiner

HEATING COOKER

This is a Continuation of application Ser. No. 15/541,219 filed Jun. 30, 2017, which in turn is a National Phase of International Patent Application No. PCT/JP2016/051793 filed Jan. 22, 2016, which claims priority to Japanese Patent Application No. 2015-011474 filed Jan. 23, 2015. The disclosures of the prior applications are hereby incorporated by reference herein in their entirety.

TECHNICAL FIELD

The present invention relates to a heating cooker that supplies steam when cooking, with heat, an object to be cooked, such as bread.

BACKGROUND ART

Known heating cookers include those using only a heater, and those using a steam generator (such as a boiler) in addition to a heater (see Patent Documents 1 to 3). Cooking methods in which steam is added during heating depending on the object to be cooked are also known.

CITATION LIST

Patent Document

Patent Document 1: JP H07-055155A
Patent Document 2: JP H08-128653A
Patent Document 3: JP 2014-023801A

SUMMARY OF INVENTION

Technical Problem

The aforementioned heating cookers have the following problems. That is to say, when cooking toast, which is main usage of those heating cookers, moisture that is originally contained in bread, such as a slice of square bread, evaporates during cooking, and the texture and taste thereof is lost. Also, as in the case where a savory smell comes from the toaster during cooking, the smell of butter contained in the bread also escapes to the air with the evaporation of the moisture, and the flavor is significantly lost.

Furthermore, dressed bread, croissants, and the like are burnt on their surface before being heated to the inside, and there has been no method for optimally heating these kinds of bread.

Also, a water tank is necessary to supply water to a boiler. If the water in the tank is not used up, or the water remains in the boiler, the tank needs to be cleaned or the water needs to be drained for hygiene, which takes time and effort.

The present invention aims to provide a heating cooker that is capable of perform cooking to serve tasty food by appropriately managing moisture of an object to be cooked without burning the surface thereof.

The present invention also aims to provide a heating cooker that has a steam function and is capable of performing cooking while appropriately maintaining a hygienic state of an object to be cooked by using up all water.

Solution to Problem

To solve the foregoing problems and achieve the above-stated objects, a heating cooker according to the present invention is configured as follows.

A box-shaped housing; a cooking cavity for accommodating an object to be cooked, the cooking cavity being arranged within the housing; a heater arranged within the cooking cavity; a steam generator arranged within the cooking cavity; a water tray into which a given amount of water is poured, the given amount of water being entirely evaporated within the given steaming time; a water guide passage for supplying the water from the water tray to the steam generator; and a control unit for causing an operation to generate steam from the steam generator to be performed for at least the steaming time from when cooking starts, are provided.

Advantageous Effects of Invention

According to the present invention, cooking can be performed to serve tasty food by appropriately managing moisture of an object to be cooked without burning the surface thereof. Also, the steam function is provided but no water tank is necessary, and cooking can be performed while appropriately maintaining a hygienic state of an object to be cooked by using up the water.

DESCRIPTION OF EMBODIMENTS

Figure 1:
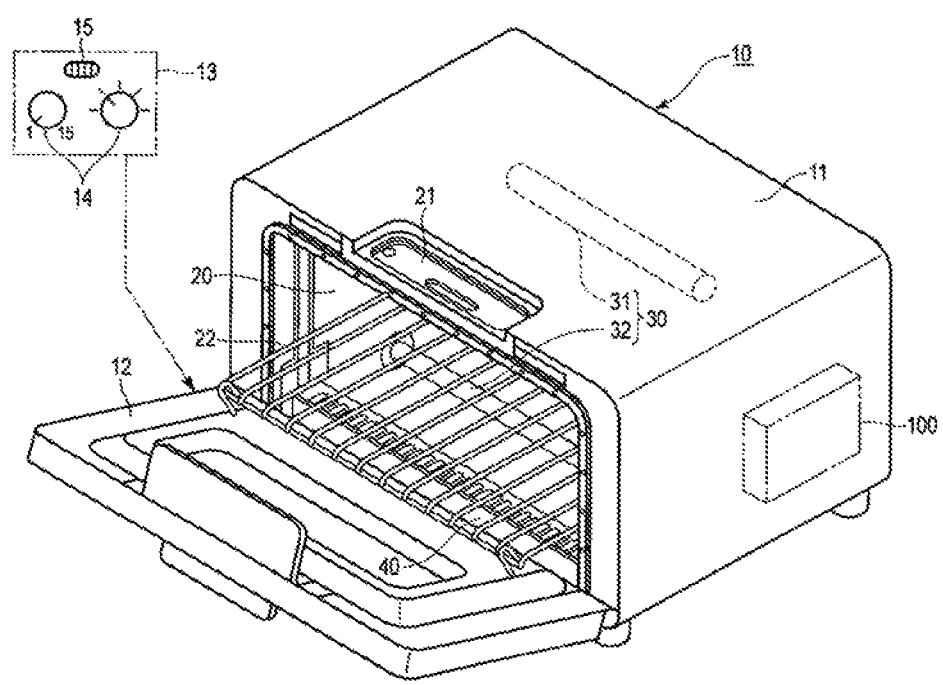
FIG. 1 is a perspective view showing a heating cooker according to a first embodiment of the present invention.
Figure 2:
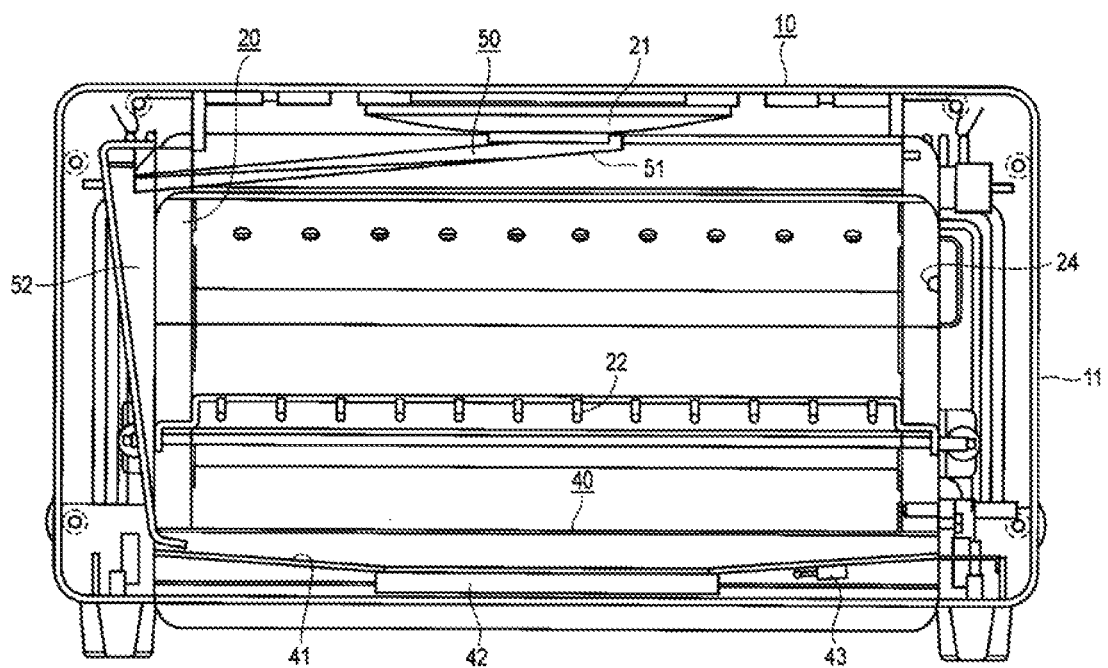
FIG. 2 is an illustrative diagram showing an internal structure of the heating cooker.
Figure 3:
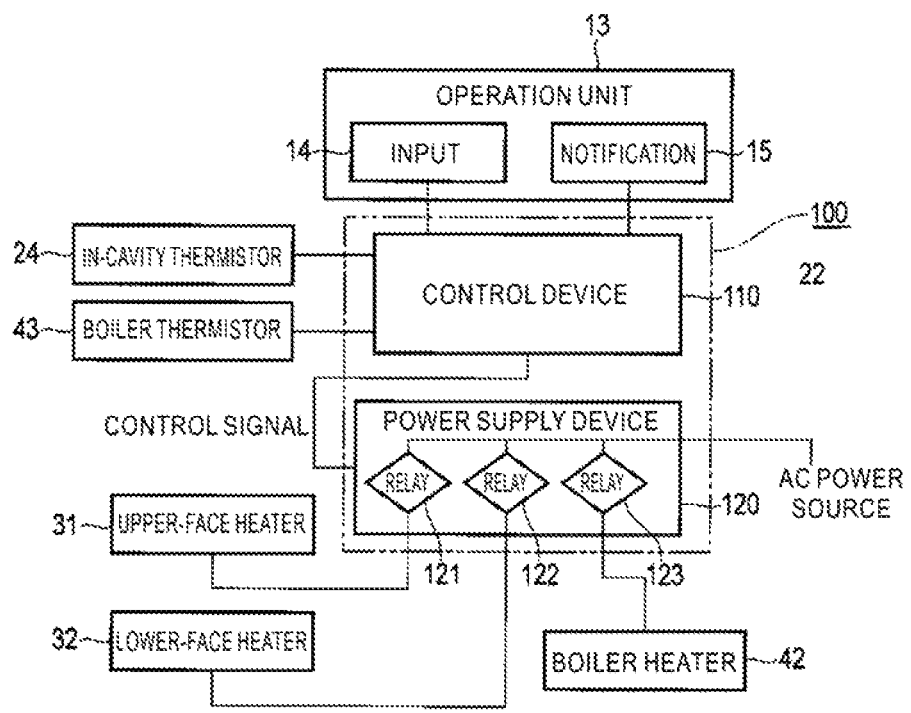
FIG. 3 is an illustrative diagram showing a control device in the heating cooker.
Figure 4:
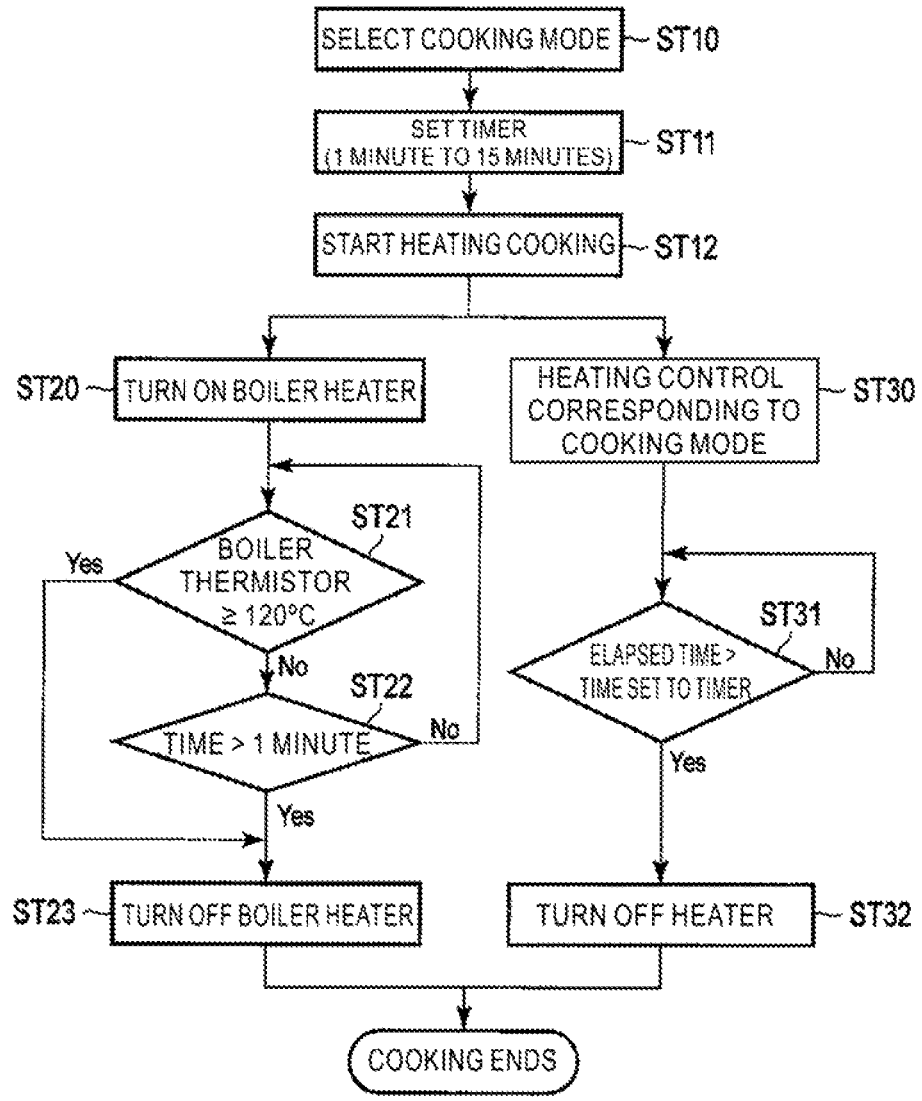
FIG. 4 is an illustrative diagram showing a heating cooking flow of the heating cooker.
Figure 5:
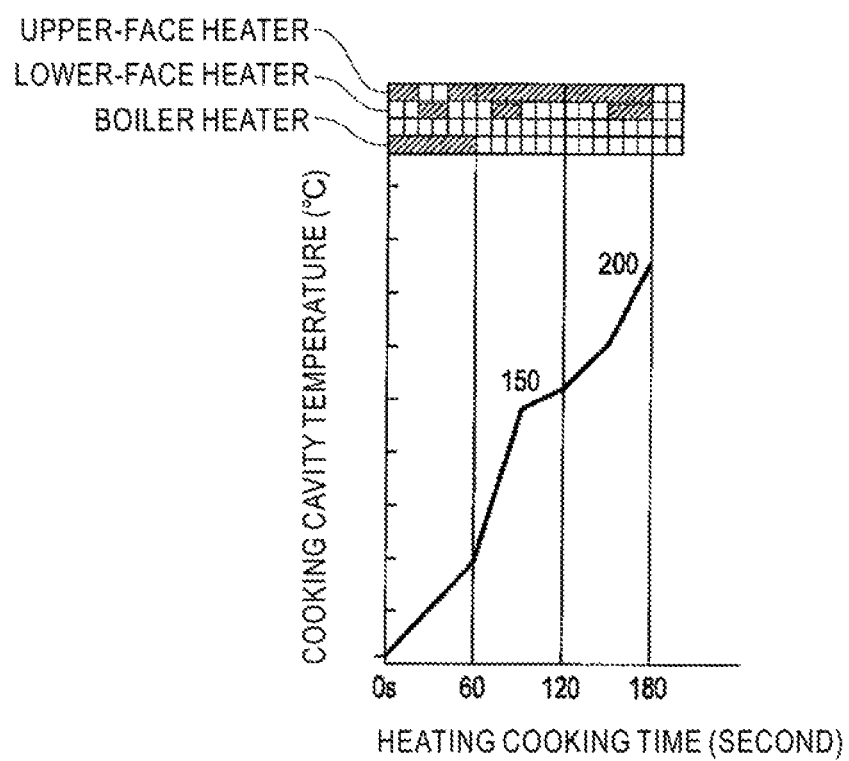
FIG. 5 is an illustrative diagram showing exemplary control in a cooking mode in the heating cooking flow.
Figure 6:
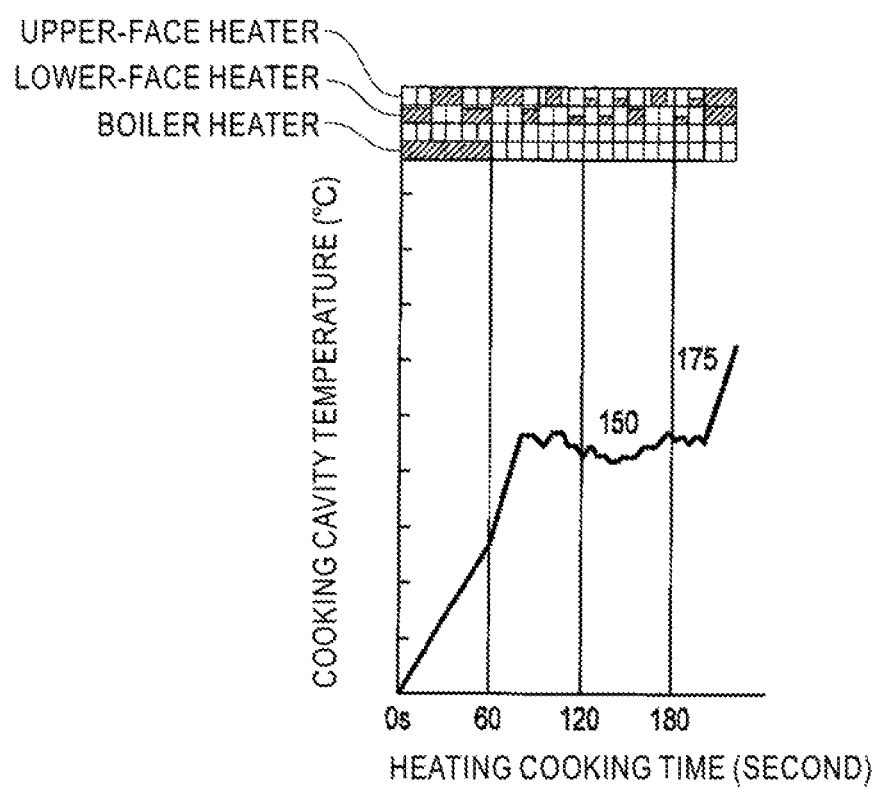
FIG. 6 is an illustrative diagram showing another example of a cooking mode in the heating cooking flow.

FIG. 1 is a perspective view showing a heating cooker 10 according to the first embodiment of the present invention. FIG. 2 is an illustrative diagram showing an internal structure of the heating cooker 10. FIG. 3 is an illustrative diagram showing a control unit 100 in the heating cooker 10. FIG. 4 is an illustrative diagram showing a heating cooking flow of the heating cooker 10. FIG. 5 is an illustrative diagram showing an example of a cooking mode in the heating cooking flow. FIG. 6 is an illustrative diagram showing another example of a cooking mode in the heating cooking flow.

The heating cooker 10 includes a rectangular parallelepiped, box-shaped housing 11, a rectangular parallelepiped cooking cavity 20 that is arranged within the housing 11 and accommodates an object to be cooked, a heater unit 30 arranged within the cooking cavity 20, a boiler (steam generator) 40 arranged within the cooking cavity 20, and a control unit 100 for controlling operations of the heater unit 30 and the boiler 40.

A door 12 is provided in a front face of the housing 11, and an operation unit 13 is provided in a front face of this door 12. The operation unit 13 is provided with an input portion 14 for setting a heating time and switching a cooking mode, and a notifying portion 15, such as an LED or a buzzer.

A water tray 21 is provided in an upper portion of the cooking cavity 20. A water guide passage 50 for guiding water W from the water tray 21 to a later-described boiler container 41 is provided in the housing 11. The water guide passage 50 includes a first guide portion 51 that guides the water W in an obliquely downward direction from the bottom of the water tray 21 toward an upper portion of an outer face of the cooking cavity 20, and a second guide portion 52 that guides the water W from the upper portion towards the lower portion of the outer face of the cooking cavity 20 in a vertical direction to the boiler container 41.

The water tray 21 can accommodate a given amount (e.g. 10 cc) of water W, and is formed to be capable of receiving the given amount of water W contained in a measuring cup M without being flooded, and causing the water W to flow into the water guide passage 50. The given amount is determined to be an amount that can be entirely evaporated in a given steaming time (e.g. 1 minute) when a later-described boiler heater 42 is energized.

A metal grill grid 22, on which an object to be cooked is placed, is provided substantially horizontally at the middle of the cooking cavity 20. Furthermore, an in-cavity thermistor (temperature sensor) 24 is provided within the cooking cavity 20.

The heater unit 30 includes an upper-face heater 31 arranged in an upper portion of the cooking cavity 20, and a lower-face heater 32 arranged in a lower portion.

The boiler 40 includes the boiler container 41 formed in a plate shape and located below the grill grid 22, the boiler heater 42 for heating the boiler container 41, and a boiler thermistor (temperature sensor) 43 attached to the boiler container 41. The capacity of the boiler container 41 is greater than or equal to a given amount (e.g. 10 cc).

The control unit 100 includes a control device 110 for giving operation instructions, and performing calculation and detection according to programs for executing a heating cooking flow shown in FIG. 4, for example, and a power supply device 120 for independently energizing the upper-face heater 31, the lower-face heater 32, and the boiler heater 42.

The control device 110 receives input from the in-cavity thermistor 24 and the boiler thermistor 43 and input from the input portion 14, and makes output to the notifying portion 15 and output to the power supply device 120. The control device 110 also causes an operation to generate steam from the boiler container 41 to be performed for at least a given steaming time (e.g. 1 minute) from when cooking starts.

The power supply device 120 is provided with a first relay 121, a second relay 122, and a third relay 123 that are connected to the upper-face heater 31, the lower-face heater 32, and the boiler heater 42, respectively.

The thus-configured heating cooker 10 performs heating cooking as follows. Initially, the door 12 is opened, and a given amount (10 cc) of water W is poured into the water tray 21. The given amount can easily be poured by pouring water using a measuring cup with a predetermined capacity (10 cc). The water W poured in the water tray 21 is guided to the boiler container 41 through the water guide passage 50. Next, an object to be cooked, such as a slice of square bread, is placed on the grill grid 22, and the door 12 is closed.

For cooking settings, a cooking mode is selected (ST10), and a timer is set (ST 11). When setting the timer, any time from 1 minute at shortest up to 15 minutes at longest can be set to adjust the degree of browning the object to be cooked. Thus, heating cooking starts (ST12), and boiler control and heating control are performed.

In boiler control, the third relay 123 operates first, and the boiler heater 42 is energized (ST20). As a result, the water W in the boiler container 41 is heated and evaporated, and the steam fills the cooking cavity 20. The steam enfolds the object to be cooked, making it difficult for the moisture in the object to be cooked to evaporate. Note that the temperature at the boiler thermistor 43 does not exceed 100° C. in a state where the water W remains After the water W has entirely evaporated and run out, the temperature in the boiler container 41 rapidly increases. When the temperature at the boiler thermistor 43 reaches or exceeds 120° C. (ST21), it is determined that the water W has run out. The control device 110 opens the third relay 123 in the power supply device 120 to stop energizing the boiler heater 42 (ST23).

If the temperature at the boiler thermistor 43 does not exceed 120° C., it is measured whether or not 1 minute has passed (ST22). The flow proceeds to ST23 if 1 minute has passed, and returns to ST21 if not.

In heating control, the first relay 121 and the second relay 122 are operated in a heating pattern corresponding to a selected cooking mode to energize the upper-face heater 31 and the lower-face heater 32, and heating cooking starts (ST30). FIGS. 5 and 6 show exemplary heating patterns.

After the elapsed time from when heating started has reached the time set to the timer (e.g. 10 minutes) (ST31), energization of the upper-face heater 31 and the lower-face heater 32 is stopped (ST32), and heating cooking ends.

As described above, with the heating cooker 10 according to this embodiment, a predetermined given amount of water W can be entirely evaporated within a given time from when cooking starts. Accordingly, no water W remains after the heating cooking. Also, since a small amount of water W is required for heating cooking, water need only be supplied every time cooking is performed, and no water tank is necessary. Accordingly, water W is always new and hygienic.

Regarding the object to be cooked, it is possible to prevent moisture from escaping from the object to be cooked and suppress oxidation of the object to be cooked to make the texture of the surface thereof crispy and make the object to be cooked tasty through cooking, by supplying steam in first 1 minute or so and thereafter heating the object to be cooked, rather than continuously supplying steam during cooking or supplying steam at the last stage of cooking. For this reason, this heating cooker is suitable for objects to be cooked such as croissants.

Furthermore, in the case of an object to be cooked such as toast, moisture that is originally contained in the bread is not evaporated during cooking, and the texture and taste thereof are not lost. The smell of butter contained in the bread is not lost with the evaporation of the moisture either, and the flavor can be maintained. In addition, there has been no method to optimally heat dressed bread, croissants, and the like since the surface thereof is burnt before being heated to the inside. However, the heating cooker 10 can heat the bread to the inside without burning the surface thereof.

Figure 7:
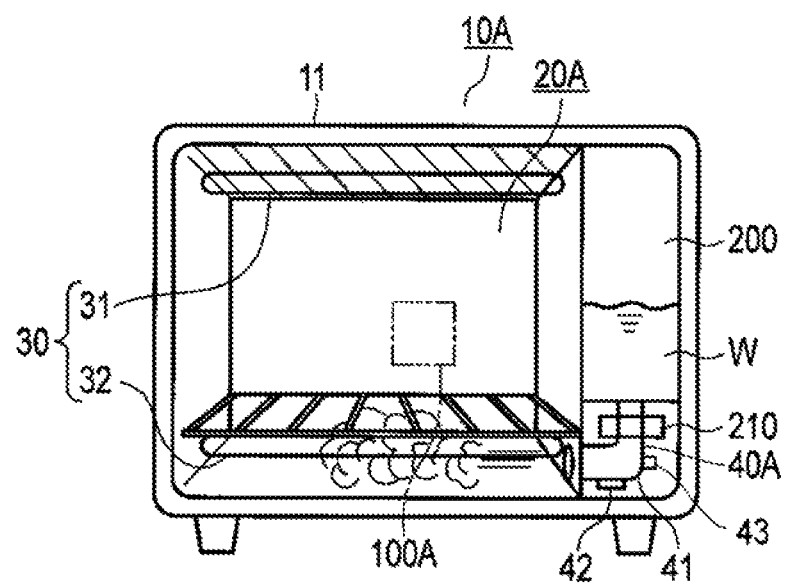
FIG. 7 is a perspective view showing main part of a heating cooker according to a second embodiment of the present invention.
Figure 8:
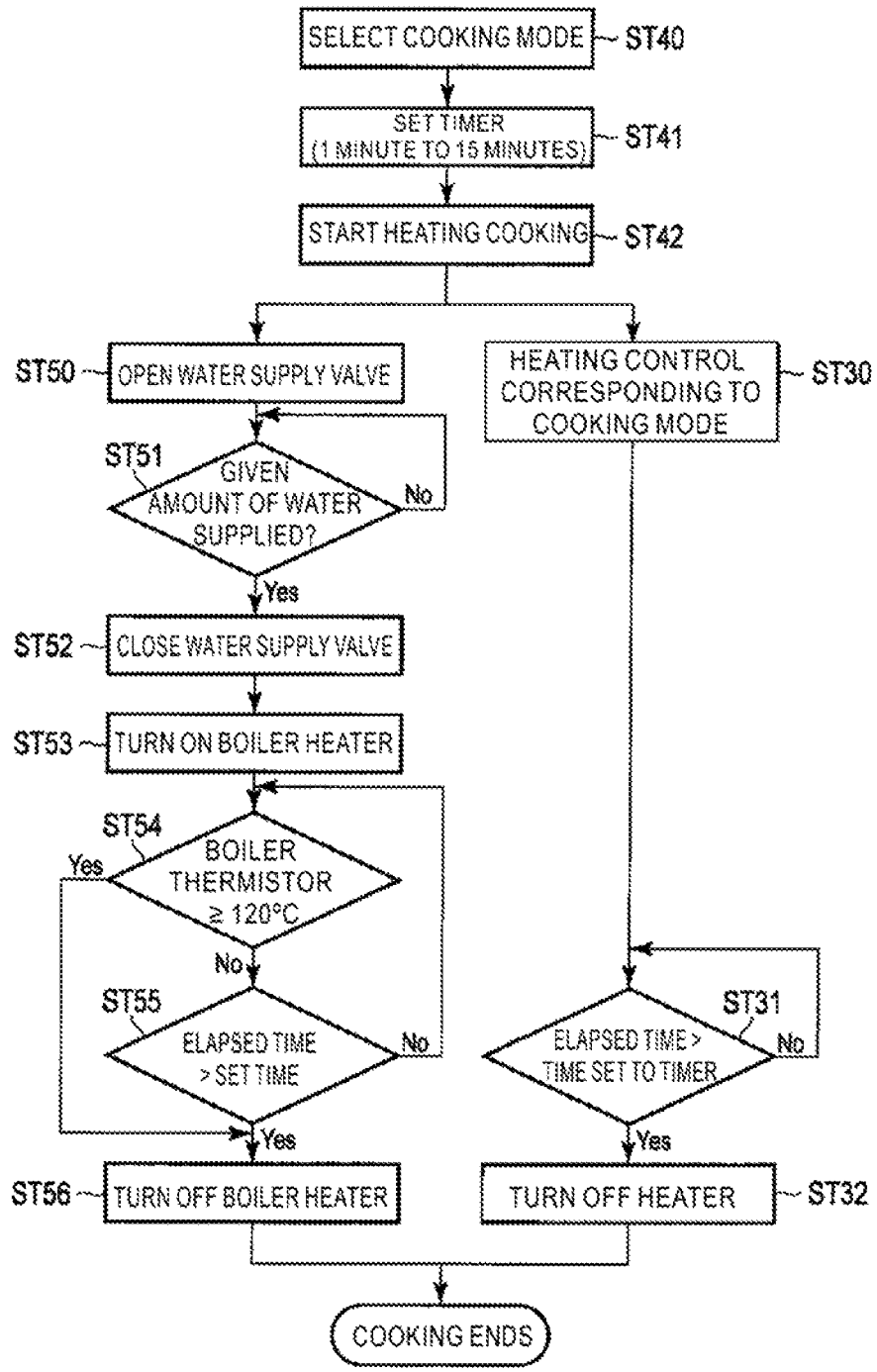
FIG. 8 is an illustrative diagram showing a heating cooking flow of the heating cooker according to the second embodiment of the present invention.

FIG. 7 is a perspective view showing a heating cooker 10A according to the second embodiment of the present invention with a door 12 removed. FIG. 8 is an illustrative diagram showing a heating cooking flow of the heating cooker 10A. Note that, in FIG. 7, the same functional portions as those in FIGS. 1 and 2 are assigned the same signs, and detailed descriptions thereof will be omitted.

The heating cooker 10A includes a rectangular parallelepiped, box-shaped housing 11, a rectangular parallelepiped cooking cavity 20A that is arranged within the housing 11 and accommodates an object to be cooked, a heater unit 30 arranged within the cooking cavity 20A, a boiler (steam generator) 40A arranged next to the cooking cavity 20A, and a control unit 100A for controlling operations of the heater unit 30 and the boiler 40A.

The cooking cavity 20A is provided with a water tank 200 with a capacity of 1000 cc, for example, and a water supply valve 210 provided below the water tank 200, in place of the water tray 21 and the water guide passage 50.

The water supply valve 210 is configured to be able to measure a given amount (e.g. 10 cc) of water W and supply the water W to a boiler container 41. The given amount is determined to be an amount that can be entirely evaporated in a given steaming time (e.g. 1 minute) when a later-described boiler heater 42 is energized.

The boiler 40 is provided below the water tank 200, and includes the boiler container 41, the boiler heater 42 for heating the boiler container 41, and a boiler thermistor (temperature sensor) 43 attached to the boiler container 41. The capacity of the boiler container 41 is greater than or equal to a given amount (e.g. 10 cc).

A control unit 100A has a function of giving operation instructions, and performing calculation and detection according to programs for executing a heating cooking flow shown in FIG. 8, for example.

The thus-configured heating cooker 10A performs heating cooking as follows. Initially, the door 12 is opened, and water W of an amount (e.g. 800 cc) that is close to the upper limit of the capacity of the water tank 200 is poured into the water tank 200. Next, an object to be cooked, such as toast (a piece of square bread), is placed on the grill grid 22, and the door 12 is closed.

For cooking settings, a cooking mode is selected (ST40), and a timer is set (ST41). When setting the timer, any time from 1 minute at shortest up to 15 minutes at longest can be set to adjust the degree of browning the object to be cooked. Thus, heating cooking starts (ST42), and boiler control and heating control are performed.

In boiler control, the water supply valve 210 is opened (ST50), a given amount (e.g. 10 cc) of water W corresponding to a cooking mode is supplied from the water tank 200 to the boiler container 41 (ST51), and the water supply valve 210 is closed (ST52). The boiler heater 42 is then energized (ST53), and thus the water W in the boiler container 41 is heated to become steam, and blows into the cooking cavity 20A. The steam enfolds the object to be cooked, making it difficult for the moisture in the object to be cooked to evaporate. Note that the temperature at the boiler thermistor 43 does not exceed 100° C. in a state where the water W remains. After the water W has entirely evaporated and run out, the temperature in the boiler container 41 rapidly increases. When the temperature at the boiler thermistor 43 reaches or exceeds 120° C., it is determined that the water W has run out (ST54), and energization of the boiler heater 42 is stopped (ST56).

If the temperature at the boiler thermistor 43 does not exceed 120° C., it is measured whether or not the time set in the cooking mode has passed (ST55). If the time set in the cooking mode has passed, the flow proceeds to ST56.

Heating control is the same as that in the above-described heating cooker 10, and a description thereof will be omitted.

As described above, with the heating cooker 10A according to this embodiment, a predetermined given amount of water W can be entirely evaporated in a given time, and accordingly, no water W remains after the heating cooking. Also, since water W required for heating cooking is supplied using the water supply valve 210 in accordance with the cooking mode, it is not necessary to supply water every time cooking is performed. Furthermore, the necessary amount of water W can be adjusted in accordance with the cooking mode, and a change in the size or type of an object to be cooked can be dealt with.

Regarding the object to be cooked, it is possible to prevent moisture from escaping from the object to be cooked and suppress oxidation of the object to be cooked to make the texture of the surface thereof crispy and make the object to be cooked tasty through cooking, by supplying steam in first 1 minute or so and thereafter heating the object to be cooked, rather than continuously supplying steam during cooking or supplying steam at the last stage of cooking. For this reason, this heating cooker is suitable for objects to be cooked such as croissants.

In addition, the same effects as those of the heating cooker 10 can be achieved.

Figure 9:
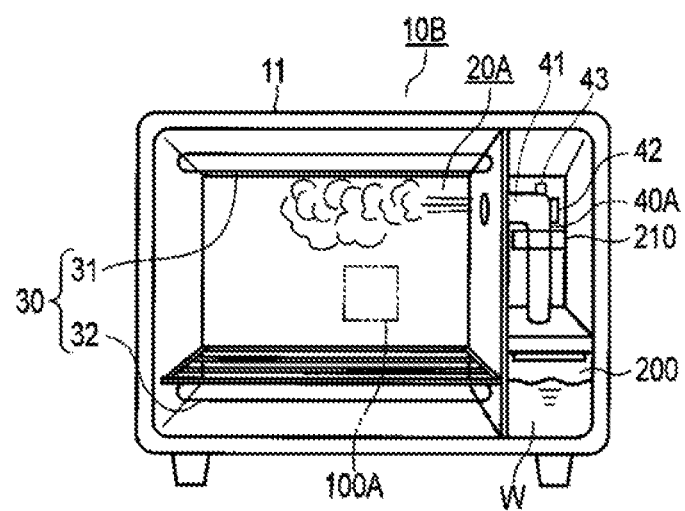
FIG. 9 is a perspective view showing main part of a heating cooker according to a third embodiment of the present invention.

FIG. 9 is a perspective view showing a heating cooker 10B according to the third embodiment of the present invention with a door 12 removed. In FIG. 9, the same functional portions as those in FIG. 7 are assigned the same signs, and detailed descriptions thereof will be omitted.

The heating cooker 10B is provided with a boiler 40 above a water tank 200. The heating cooker 10B can also perform heating cooking similar to the heating cooker 10A, and can achieve the same effects as those of the heating cooker 10A.

Note that the present invention is not limited to the above-described embodiments. For example, although the above example uses the boiler 40 as a steam generator, steam may be generated using an ultrasonic generation device. The configuration or the like of the heater unit 30 may be changed as appropriate in accordance with the size and shape of the cooking cavity 20, the type of an object to be cooked, or the like. Furthermore, although the given steaming time is set to 1 minute, it is not limited to this time, and may be changed as appropriate in accordance with the size of the cooking cavity 20, the type of an object to be cooked, or the like. Of course, the present invention may be modified and implemented in various manners without departing from the gist of the invention.

LIST OF REFERENCE NUMERALS 10, 10A, 10B Heating cooker
11. Housing
12 Door
13 Operation unit
14 Input portion
15 Notifying portion
20, 20A Cooking cavity
21 Water tray
22 Grill grid
24 In-cavity thermistor (temperature sensor)
30 Heater unit
31 Upper-face heater
32 Lower-face heater 40 Boiler (steam generator)
41 Boiler container
42 Boiler heater
43 Boiler thermistor (temperature sensor)
50 Water guide passage
100 Control unit
110 Control device
120 Power supply device
200 Water tank
210 Water supply valve
W Water

The invention claimed is:

1. A toaster comprising:
a box-shaped housing with a cooking cavity for accommodating an object to be cooked;
a water tray at an upper portion of the housing, wherein the water tray is configured to have water poured therein;
a heater in the housing and configured to heat the object to be cooked;
a steam generator in the housing and configured to feed steam into the cooking cavity;
a water guide passage in the housing and configured to guide the water poured into the water tray to the steam generator;
a control unit in the housing and configured to control operations of the heater and the steam generator; and
a door for the cooking cavity that exposes the water tray and allows the water be poured into the water tray when the door is open, wherein
the door is in a front face of the housing, and
the water tray has an opening that faces, and is accessible through, a top face of the housing.

2. The toaster according to claim 1, wherein the door has a lower end portion attached to the housing, and is openable and closable.

3. The toaster according to claim 1, wherein the water tray is in a front part of the top face of the housing.

4. The toaster according to claim 1, wherein a portion of the door is configured to cover the opening by extending along the top face when the door is in a closed position.

* * * * *